United States Patent [19]
Perkins et al.

[11] Patent Number: 5,972,417
[45] Date of Patent: Oct. 26, 1999

[54] SPRAY GUN POWER SUPPLY MONITOR

[75] Inventors: Jeffrey A. Perkins, Lorain; Thomas A. Trautzsch, North Royalton, both of Ohio

[73] Assignee: Nordson Corporation, Westlake, Ohio

[21] Appl. No.: 08/971,112

[22] Filed: Nov. 14, 1997

[51] Int. Cl.⁶ .................................................. B05D 1/00
[52] U.S. Cl. .................. 427/8; 427/457; 427/458; 118/620; 118/623; 118/629; 118/712; 239/690; 239/708; 361/228; 361/235
[58] Field of Search ................... 118/620, 623, 118/629, 712; 427/457, 458, 8; 239/690, 708; 361/228, 235

[56] References Cited

U.S. PATENT DOCUMENTS

| | | | |
|---|---|---|---|
| 4,000,443 | 12/1976 | Lever | 361/228 |
| 4,266,262 | 5/1981 | Haase, Jr. | 361/228 |
| 4,672,500 | 6/1987 | Roger et al. | 361/228 |
| 5,566,042 | 10/1996 | Perkins et al. | 361/228 |

*Primary Examiner*—Laura Edwards
*Attorney, Agent, or Firm*—Calfee, Halter & Griswold LLP

[57] ABSTRACT

An apparatus for use in electrostatically applying coating material to an object includes a nozzle which directs a flow of coating material toward the object. A power supply unit provides an electric field to electrostatically charge the coating material. Control circuitry is provided to monitor the operating efficiency of the power supply unit and to provide an output signal when there is an impending failure of the power supply unit. The control circuitry monitors the relationship between an input current to the power supply unit and an output current from the power supply unit. When the relationship between the input current to the power supply unit and the output current from the power supply unit is outside of a predetermined range, the control circuitry is effective to provide an output signal to notify an operator that there is an impending power supply unit failure.

10 Claims, 1 Drawing Sheet

SPRAY GUN POWER SUPPLY MONITOR

BACKGROUND OF THE INVENTION

The present invention relates to an apparatus which is used to electrostatically apply coating material to an object. More specifically, the present invention relates to control circuitry which monitors the operation of a power supply unit for an electrostatic spray gun.

Electrostatic spray guns have been used to apply either liquid or powder coating material to an object. The spray gun may include an electrode which creates an electric field which is effective to electrostatically charge particles of the coating material. A power supply unit converts a relatively low input voltage to a relatively high output voltage to charge the electrode. After extensive use of the spray gun, the power supply unit may fail due to many different causes, including failure of components of the power supply unit or break down of dielectric materials in the power supply unit.

During use of the spray gun, the failure of the power supply unit may be so gradual as to be imperceptible to an operator of the spray gun. This may result in a gradual degradation of the quality of coatings applied to a substantial number of objects before the operator realizes that the power supply unit is failing.

SUMMARY OF THE INVENTION

The present invention provides a new and improved apparatus for use in electrostatically applying coating material to an object. The apparatus includes a nozzle which directs a flow of coating material toward the object. A power supply unit establishes an electric field to electrostatically charge the coating material. Control circuitry is connected with the power supply unit and is operable to determine when there is an impending failure of the power supply unit.

The control circuitry may monitor the relationship between the input to the power supply unit and an output from the power supply unit. When the relationship between the input to the power supply unit and the output from the power supply unit is outside of a predetermined range of relationships, the control circuitry provides a signal indicative of an impending power supply unit failure.

BRIEF DESCRIPTION OF THE DRAWINGS

The foregoing and other features of the present invention will become more apparent upon a consideration of the following description taken in connection with the accompanying drawings wherein.

DESCRIPTION OF ONE SPECIFIC PREFERRED EMBODIMENT OF THE INVENTION

General Description

Figure 1:
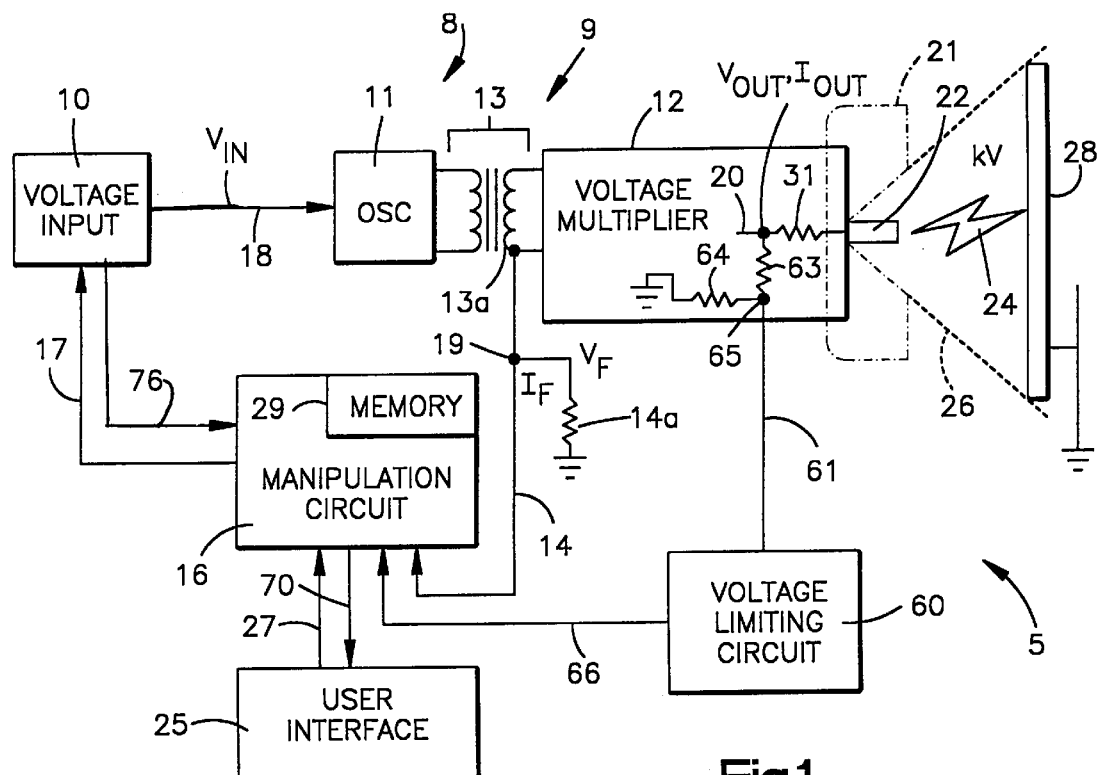
FIG. 1 is a schematic illustration of an apparatus which is constructed in accordance with the present invention to apply electrostatically charged coating material to an object.

An apparatus 8 for use in applying electrostatically charged coating material to an object is illustrated schematically in FIG. 1. The apparatus 8 may be any known type of electrostatic spray device. Thus, the apparatus 8 could be a hand held electrostatic spray gun. Alternatively, the apparatus 8 could be mounted on a base which is spaced a substantial distance from an operator.

The apparatus 8 includes a voltage input circuit 10 which supplies an input voltage $V_{IN}$ to a power supply unit 9. The power supply unit 9 includes an input oscillator 11 which is coupled to a voltage multiplier circuit 12 through a transformer 13. The voltage multiplier circuit 12 produces an output voltage $V_{OUT}$ and output load current $I_{OUT}$ for the power supply unit 9.

A feedback line 14 is coupled to the "common" side of the secondary coil 13a of transformer 13, which is connected to ground potential through a resistor 14a. The current $I_F$ is proportional to the load current $I_{OUT}$ at the output of the voltage multiplier 12. Therefore, the voltage of feedback signal $V_F$ across resistor 14a is proportional to load current $I_{OUT}$.

Line 14 conveys the feedback signal $V_F$ which is proportional to the output current, to a manipulation circuit 16. The manipulation circuit 16 may be a microprocessor. The manipulation circuit 16 varies the level of input voltage $V_{IN}$ via line 17 in response to $V_F$ and thus, modifies the operational loadline of the multiplier circuit 12 according to fluctuating output load conditions.

A typical input voltage $V_{IN}$ from input circuit 10 may range from 12 to 30 volts DC, and is input to the oscillator 11. The step transformer 13 acts as an input stage to the multiplier circuit 12. The step transformer 13 raises the input voltage to a level acceptable to the multiplier circuit input. The voltage multiplier circuit 12 multiplies the input voltage to a high voltage output $V_{OUT}$, generally in the 60–100 kilovolt (KV) range. The output voltage $V_{OUT}$ of multiplier circuit 12 is supplied on line 20 to a charging electrode 22.

The voltage multiplier circuit 12 may take one of several forms, but a preferred embodiment of the present invention utilizes a Cockcroft-Walton type multiplier circuit having a series of capacitor and diode stages (not shown) to produce a high output voltage $V_{OUT}$ for a particular spray application. The high voltage charging electrode 22 is located proximate the tip or nozzle 21 of the electrostatic spray gun where it creates an electric field and corona 24. As atomized particles of the spray material 26, which may be liquid or power, pass through the field 24, they acquire an electrostatic charge.

The charged particles 26 (FIG. 1) are sprayed or otherwise conveyed towards the electrically grounded object 28, and when the charge particles pass in proximity to the object 28, they are attracted thereto. The charging of the spray particles 26 promotes uniform material coating on the grounded object 28. Atomization of the particles can be achieved in any of the well known manners, which forms no part of this invention and therefore is not further described.

The voltage multiplier circuit 12 of power supply unit 9, operates according to what is generally referred to as a power loadline which defines the relationship between the output or load current level $I_{OUT}$ and the output voltage level $V_{OUT}$ of the multiplier circuit 12. Typically, there is a decreasing relationship between the output voltage $V_{OUT}$ and the load current $I_{OUT}$. That is, as the load current $I_{OUT}$ increases, the output voltage $V_{OUT}$ decreases. The operational loadline of the multiplier circuit 12, therefore, determines the rate at which the output voltage $V_{OUT}$ drops in response to increasing load current flow. During operation of power supply 5, an increase in load current $I_{OUT}$ will normally occur when the tip or nozzle 21 of the spray gun and the charging electrode 22 are moved in close proximity to the grounded object 28 that is being sprayed, such as when it is necessary to spray a recess or indentation within the object 28.

In one embodiment of the present invention, the manipulation circuit 16 is a microprocessor having internal or external memory 29. The microprocessor 16 is responsive to all inputs indicating the load conditions, i.e., the feedback signal $V_F$ and also to inputs from an external device which indicate the desirable load condition boost points at which loadline modification will occur. In response to these inputs, the manipulation circuit microprocessor 16 then outputs a signal on line 17 to control voltage input circuit 10 to vary the input level $V_{IN}$. The microprocessor 16 is connected to a user interface 25 by line 27. The user interface could be a keyboard (not shown) or some other input device. A user begins by inputting various load condition boost points for a particular spray application, inputting associated input voltage level boost values for each load condition boost point.

A voltage limiting circuit 60 (FIG. 1) monitors the output voltage $V_{OUT}$ when load current $I_{OUT}$ levels decrease toward a "no load" or 0 $\mu$A point. The voltage limiting circuit 60 is connected to the output of the multiplier circuit 12 through a voltage divider comprising resistors 63 and 64. It has been determined that the voltage signal available at point 65 of the voltage divider is indicative of the output voltage $V_{OUT}$ of the multiplier circuit 12.

When the load voltage level $V_{OUT}$ increases above a predetermined maximum value, as indicated at point 65 in the voltage divider network, voltage limiting circuit 60 sends a signal to microprocessor 16 on line 66. The manipulation circuit varies the input voltage level $V_{IN}$ to keep the output voltage $V_{OUT}$ at a level substantially below its normal "no load" voltage which occurs when the output current level $I_{OUT}$ is low.

The previously described general construction and mode of operation of the apparatus 8 is the same as is described in U.S. Pat. No. 5,566,042 issued Oct. 15, 1996 for "Spray Gun Device With Dynamic Loadline Manipulation Power Supply". The aforementioned U.S. Pat. No. 5,566,042 is hereby incorporated herein in its entirety by this reference thereto.

Power Supply Monitor

In accordance with a feature of the present invention, the apparatus or spray gun 8 is effective to monitor the operation of the power supply unit 9 to determine when there is an impending failure of the power supply unit. After operation of the apparatus 8 for an extended period of time, the power supply unit may begin to fail. When there is an impending failure of the power supply unit 9, the output voltage $V_{OUT}$ may decrease in a manner which would not be readily apparent to an operator. This could result in the application of defective coatings to a number of objects 28 during continued use of the apparatus 8.

In accordance with the present invention, the manipulation circuit 16 is operable to transmit a signal, to the user interface 25 by a line 70 to indicate to an operator that there is an impending failure of the power supply unit 9. This will allow the operator to interrupt operation of the apparatus 8 and replace the power supply unit 9 before the power supply unit malfunctions due to a failure of one or more components of the power supply unit.

The manipulation circuit 16 monitors the operating efficiency of the power supply unit 9 and provides an output signal over the line 70 to the user interface 25 when there is a significant change in the operating efficiency of the power supply unit. When there is an impending failure of the power supply unit 9, the operating efficiency of the power supply unit will decrease. Upon detection of a decrease in the operating efficiency of the power supply unit 9, the microprocessor 16 provides an output signal over the line 70 to the user interface 25. The signal provided over the line 70 to the user interface 25 enables an operator of the apparatus 8 to replace the power supply unit 9 prior to failure of the power supply unit to an extent which is sufficient to cause the application of a defective coating to the object 28.

To monitor the operating efficiency of the power supply unit 9, the manipulation circuit 16 determines the relationship between an input to the power supply unit and an output from the power supply unit. When there is an impending failure of the power supply unit 9, the relationship between the input to the power supply unit and the output from the power supply unit will be outside of a predetermined range of relationships. When the manipulation circuit 16 determines that the relationship between the input to the power supply unit 9 and the output from the power supply unit is outside of a predetermined range of relationships, the manipulation circuit 16 provides an output over the line 70 to the user interface 25.

In the embodiment of the invention illustrated in FIG. 1, the manipulation circuit 16 monitors the relationship between an input current to the power supply unit 9 and an output current from the power supply unit. The manipulation circuit 16 provides a signal indicative of impending power supply unit failure when the relationship between the input current to the power supply unit 9 and the output current from the power supply unit is outside of a predetermined relationship. The determination as to whether or not the input current to the power supply unit and the output current from the power supply unit are outside of a predetermined relationship can be made in many different ways.

In the embodiment of the invention illustrated in FIG. 1, when a fractional relationship of the output current of the power supply unit 9 to the input current of the power supply unit ($I_{OUT}/I_{IN}$) is below a predetermined threshold, the manipulation circuit 16 provides an output signal to the user interface 70 indicative of the impending failure. It should be understood that relationships other than the fractional relationship of output current to input current for the power supply unit 9 could be used to monitor the operating efficiency of the power supply unit. For example, the relationship between the input power to the power supply unit to the output power from the power supply unit could be used to monitor operating efficiency of the power supply unit.

When the apparatus or spray gun 8 is being used, the output load between the charging electrode 22 and the object 28 will vary as a function of the distance between the electrode and the object. Thus, the greater the distance between the electrode 22 and the object 28, the greater will be the resistance between the electrode and the object. As the distance between the electrode 22 and the object 28 decreases, the resistance to the establishment of the electric field and corona 24 decreases.

As the resistance between the electrode 22 and the object 28 decreases, the output voltage from the power supply unit 9 decreases and the output current from the power supply unit increases. As the output current from the power supply unit 9 increases, the input current to the power supply unit increases. When the power supply unit 9 is operating properly, the ratio of the output current to the input current will remain above a predetermined threshold.

A signal which is a function of the input current to the power supply unit 9 is conducted over a lead 76 to the manipulation circuit 16. A signal which is a function of the output current from the power supply unit 9 is conducted over the lead 14 to the manipulation circuit 16.

During the application of coating material to one specific object 28 with one specific spray gun or apparatus 8, the relationship between the load between the electrode 22, and the object, the input current ($I_{IN}$) and the output current ($I_{OUT}$) varied as set forth in the following chart:

|    | LOAD  | $I_{IN}$ | $I_{OUT}$ | RATIO |
|----|-------|------|-------|-------|
| 1  | 4G    | 0.37 | 18.9  | 1718  |
| 2  | 2G    | 0.39 | 32.8  | 1058  |
| 3  | 1.5G  | 0.4  | 41    | 1000  |
| 4  | 1G    | 0.43 | 55    | 775   |
| 5  | 800M  | 0.45 | 65    | 714   |
| 6  | 600M  | 0.48 | 77.7  | 642   |
| 7  | 500M  | 0.49 | 85.9  | 656   |
| 8  | 400M  | 0.51 | 96.8  | 641   |
| 9  | 300M  | 0.52 | 109.8 | 682   |
| 10 | 200M  | 0.54 | 124.6 | 688   |
| 11 | SHORT | 0.5  | 137   | 972   |

In the above chart, the load is indicated in either giga ohms (G) or mega ohms (M). The input current ($I_{IN}$) is indicated in amps and the output current ($I_{out}$) is indicated in microamps. The ratio is obtained by dividing the output current by the quantity which results from subtracting 0.359 from the input current ($I_{OUT}/(I_{IN}-0.359)$).

Figure 2:
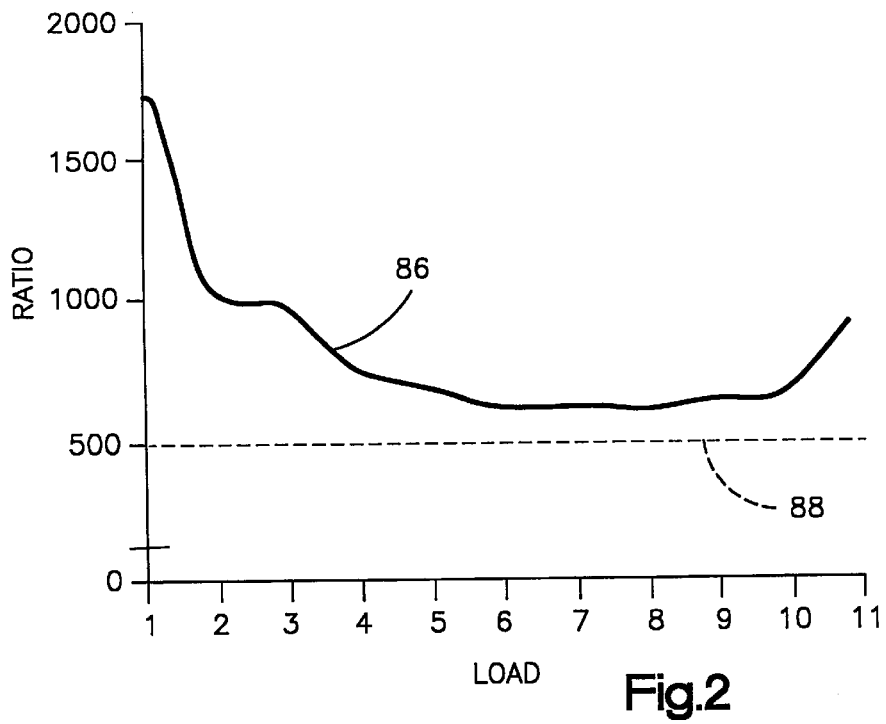
FIG. 2 is a graph illustrating the manner in which the relationship between an input to a power supply unit in the apparatus of FIG. 1 varies relative to the output from the power supply unit with variations in the distance between the apparatus and an object to which the coating material is applied.

The manner in which the ratio varies with the load or distance between the electrode 22 and the object 28, is illustrated by the graph of FIG. 2. Thus, in FIG. 2, the ordinate is the value of the ratio indicated in the above chart and the abscissa indicates the load or distance between the electrode 22 and the object 28. The manner in which the ratio varies with variations in the distance between the electrode 22 and the object 28 or load is indicated by a curve 86 in FIG. 2.

During normal operation of the spray gun or apparatus 8, the ratio, as indicated by the curve 86 in FIG. 2, is above a threshold, indicated by a dashed line 88 in FIG. 2. Although not shown by the curve 86, when the electrode 22 is moved from what must be considered as an infinite distance from the object 28 toward the object, the ratio rapidly increases from a level below the threshold 88 to a level above the threshold. The microprocessor of the manipulation circuit 16 is programmed to ignore the rapid change in the ratio 86 which occurs during movement of the spray gun or apparatus 8 into operating relationship with the object 28. Therefore, the microprocessor ignores variations in the ratio until the ratio exceeds 1,000 or some preselected minimum.

During operation of the apparatus 8, current conducted over the lead 14 to the multiplication circuit 16 will be a function of the output current ($I_{OUT}$) of the power supply unit 9. Similarly, the current conducted over the lead 76 to the manipulation circuit 16 will be a function of the input current ($I_{IN}$) conducted from the voltage input 10 to the power supply unit 9. When the power supply unit is operating properly during the application of coating material to the article 28, the ratio of the output current to the input current will vary in the manner indicated by the curve 86 in FIG. 2 with variations in the load or distance between the electrode 22 and workpiece 28. During normal operation of the power supply unit 9, the ratio 86 will remain above the threshold 88. However, if there is an impending failure of the power supply unit 9, the ratio 86 will fall below the threshold 88. When this occurs, the manipulation circuit 16 provides an output, over the lead 70, to the user interface 25.

In response to the output over the lead 70 to the user interface 25, the operator interrupts operation of the apparatus 8 and changes the power supply. This enables the operator to change the power supply before the extent of failure of the power supply has been sufficient to impair the quality of the coating applied to the object 28.

In the foregoing description, the ratio indicated by the curve 86 is the ratio of the output current to the input current. However, it should be understood that a different relationship could be utilized if desired. For example, the ratio could be the ratio of the input power to the output power.

Rather than using a ratio of input current to output current or input power to output power, the apparatus 8 could be constructed to utilize a look-up table. When such a table is utilized, the value of either the input current relative to either the output current would be compared with values stored in the manipulation circuit 16. When there is an impending failure of the power unit 9, the look-up table would indicate that the relative values of the input and output were such as to be outside of a predetermined range of values. This would result in the manipulation circuit 16 providing an output signal to the user interface 25 over the lead 70 to indicate to an operator that there was an impending failure of the power supply unit 9.

It should be understood that the operating characteristics of each spray gun 8 will be different from the operating characteristics of other spray guns. Therefore, the specific relationship between the input current ($I_{IN}$) and output current ($I_{OUT}$) will be different for different spray guns. However, an impending failure of a power supply unit for any one spray gun will be indicated by a change in the operating efficiency of the spray gun and a change in the relationship of the input current to the output current.

Conclusion

The present invention provides a new and improved apparatus 8 for use in electrostatically applying coating material to an object 28. The apparatus includes a nozzle 21 which directs a flow of coating material toward the object 28. A power supply unit 9 establishes an electric field to electrostatically charge the coating material. Control circuitry 16 is connected with the power supply unit and is operable to determine where there is an impending failure of the power supply unit 9.

The control circuitry 16 may monitor the relationship between the input current to the power supply unit and an output current from the power supply unit. When the relationship between the input current to the power supply unit and the output current from the power supply unit is outside of a predetermined range of relationships, the control circuitry provides a signal indicative of an impending power supply unit failure.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for use in applying electrostatically charged coating material from a nozzle to an object, said apparatus comprising a power supply to electrostatically charge the coating material, said power supply producing an output current in response to an input current; and a power supply monitoring circuit connected with said power supply, said monitoring circuit being operable to monitor the operating condition of the power supply during application of coating material to the object by detecting a first signal that is related to said output current of said power supply and detecting a second signal that is related to said input current of said power supply and to determine when there is an impending failure of said power supply based on said first and second signals.

2. The apparatus of claim 1 wherein said power supply monitoring circuit provides a signal indicative of an impending power supply failure when there is a significant change in the operating efficiency of the power supply.

3. The apparatus of claim 1 wherein said first signal is related to input power to said power supply and said second signal is related to output power from said power supply.

4. A monitoring circuit for an electrostatic spray device, said monitoring circuit comprising:

a power supply used to electrostatically charge a coating material flowing from the spray device to an object;

a first circuit that detects a first signal related to an output current of said power supply;

a second circuit that detects a second signal related to an input current of said power supply; and a monitoring circuit for detecting a change in the operating efficiency of the power supply; said monitoring circuit being operable to determine when there is an impending failure of the power supply based on said first and second signals during application of coating material to the object.

5. The monitoring circuit of claim 4 wherein said first and second signals are based respectively on output power and input power characteristics of the power supply.

6. The monitoring circuit of claim 4 wherein said monitoring circuit comprises a ratio circuit that produces a signal indicative of an impending power supply failure based on a ratio of said first and second signals being outside a predetermined range.

7. The monitoring circuit of claim 6 wherein said signal indicative of an impending power supply failure is perceptible to an operator of the spray device.

8. The monitoring circuit of claim 4 wherein said monitoring circuit produces a signal related to operating efficiency of said power supply based on a ratio of said first and second signals being below a predetermined value.

9. A method for monitoring a power supply used in an electrostatic spray device, comprising the steps of:

a) producing a first signal related to an output current characteristic of the power supply;

b) producing a second signal related to an input current characteristic of the power supply;

c) determining when there is a change in the operating efficiency of the power supply based on said first and second signals; and d) producing a signal indicative of an impending power supply failure based on said detected change.

10. The method of claim 9 further comprising the step of producing a signal indicative of an impending power supply failure when a ratio of said first and second signals is below a predetermined value.

* * * * *